(12) United States Patent
Kato et al.

(10) Patent No.: US 8,813,606 B2
(45) Date of Patent: Aug. 26, 2014

(54) TRANSMISSION (75) Inventors: Naoki Kato, Aichi-gun (JP); Masashi Ikemura, Toyota (JP); Takeshi Ishiwada, Toyota (JP); Kazuaki Nakamura, Toyota (JP); Fuminori Monji, Toyota (JP); Tadanori Fujii, Toyota (JP); Tatuya Ishiguro, Toyota (JP); Hiroyuki Ogasawara, Anjo (JP); Hiroki Goshima, Nukata-gun (JP)

(73) Assignees: Toyota Jidosha Kabushiki Kaisha, Toyota (JP); Aisin AW Co., Ltd., Anjo (JP)

( * ) Notice: Subject to any disclaimer, the term of this patent is extended or adjusted under 35 U.S.C. 154(b) by 1120 days.

(21) Appl. No.: 12/461,949

(22) Filed: Aug. 28, 2009

(65) Prior Publication Data

US 2010/0095795 A1    Apr. 22, 2010

(30) Foreign Application Priority Data

Oct. 22, 2008    (JP) ................. 2008-271567

(51) Int. Cl.
| | |
|---|---|
| F16C 1/10 | (2006.01) |
| F16H 57/027 | (2012.01) |
| F16H 59/04 | (2006.01) |
| F16H 61/36 | (2006.01) |

(52) U.S. Cl.
CPC ............... *F16H 57/027* (2013.01); *F16H 61/36* (2013.01)
USPC ................... 74/606 R; 74/473.15; 74/473.36; 123/196 R; 184/6.5

(58) Field of Classification Search
CPC ............................ F16H 61/36; F16H 57/027
USPC .................. 74/606 R; 475/160; 184/6.4, 6.5; 123/572, 196 R
See application file for complete search history.

(56) References Cited

U.S. PATENT DOCUMENTS 4,203,331 A * 5/1980 Shindo et al. ............... 74/606 R
4,498,353 A * 2/1985 Kitade ......................... 74/606 R
(Continued)

FOREIGN PATENT DOCUMENTS

JP    U-59-052287    4/1984
JP    A-60-113864    6/1985
(Continued)

OTHER PUBLICATIONS

PTO 13-1979 English Translation of JP 59-52287, Takumi Toyoshima, Apr. 6, 1984.*

(Continued)

*Primary Examiner* — Vinh Luong
(74) *Attorney, Agent, or Firm* — Oliff PLC (57) ABSTRACT

A transmission includes a case having an internal space; a first partition wall which is provided in the case and forms a boundary between a first chamber which is arranged in the case and houses a rotating object, and a second chamber which is arranged in the case, is connected to the first chamber, and maintains equal pressure between the first chamber and outside air; a second partition wall which is provided in the case and forms a boundary between the second chamber and a third chamber which is arranged in the case and stores fluid below the second chamber; and a third partition wall which is provided in the case and forms a boundary between the first chamber and the third chamber. A first hole and a second hole are formed in that order from the first chamber side in the second partition wall.

16 Claims, 5 Drawing Sheets

(56) References Cited

U.S. PATENT DOCUMENTS

| | | | |
|---|---|---|---|
| 7,121,249 B2* | 10/2006 | Hamada et al. | 123/196 R |
| 7,343,833 B2* | 3/2008 | Matsushima | 74/607 |
| 7,841,449 B2* | 11/2010 | Nakamura et al. | 184/6.4 |
| 8,366,579 B2* | 2/2013 | Tokai et al. | 475/160 |
| 2003/0136219 A1* | 7/2003 | Gotou et al. | 74/606 R |
| 2007/0062500 A1* | 3/2007 | Arima et al. | 123/572 |
| 2008/0000319 A1* | 1/2008 | Kitamura | 74/606 A |
| 2010/0024591 A1* | 2/2010 | Yamaguchi | 74/606 R |
| 2011/0011204 A1* | 1/2011 | Ueno et al. | 74/606 R |

FOREIGN PATENT DOCUMENTS

| | | | | |
|---|---|---|---|---|
| JP | U-63-146257 | | 9/1988 | |
| JP | U-02-004050 | | 1/1990 | |
| JP | U-02-022451 | | 2/1990 | |
| JP | U-02-074648 | | 6/1990 | |
| JP | 2712895 | * | 10/1997 | F16H 57/02 |
| JP | 2892069 | * | 2/1999 | F16H 57/02 |
| JP | A-2008-75850 | | 4/2008 | |

OTHER PUBLICATIONS

PTO 13-1978 English Translation of JP 60-113864, Shintaro Muramatsu, Jun. 20, 1985.*

English Abstract of JP 2712895, Oct. 1997.*

English Abstract of JP 2892069, Feb. 1999.*

Apr. 24, 2012 Office Action issued in Japanese Patent Application No. 2008-271567 (with translation).

* cited by examiner

⟶ ATF PATH
------▶ AIR PATH

US 8,813,606 B2

TRANSMISSION

INCORPORATION BY REFERENCE

The disclosure of Japanese Patent Application No. 2008-271567 filed on Oct. 22, 2008, including the specification, drawings and abstract is incorporated herein by reference in its entirety.

BACKGROUND OF THE INVENTION

1. Field of the Invention

The invention relates to a transmission, and more particularly, to a transmission having a breather structure.

2. Description of the Related Art

Japanese Patent Application Publication No. 2008-75850 (JP-A-2008-75850), for example, describes one example of a transmission.

In JP-A-2008-75850, when the temperature of hydraulic fluid in an automatic transmission is high, the level of the hydraulic fluid rises due to air bubbles mixing in with the hydraulic fluid, as well as expansion of the hydraulic fluid. As a result, when the hydraulic fluid is agitated by a rotating element, it may leak from a breather plug. With the transmission described in JP-A-2008-75850, control is used to prevent the hydraulic fluid from leaking. However, this control may not always be able to sufficiently prevent hydraulic fluid (i.e., fluid) from leaking.

SUMMARY OF THE INVENTION

This invention thus provides a transmission able to prevent fluid from leaking out of a transmission case.

A first aspect of the invention relates to a transmission. This transmission includes a case having an internal space; a first chamber which is arranged in the case and houses a rotating object; a second chamber which is arranged in the case, is connected to the first chamber, and maintains equal pressure between the first chamber and outside air; a third chamber which is arranged in the case and stores fluid below the second chamber; a first partition wall which is provided in the case and forms a boundary between the first chamber and the second chamber; a second partition wall which is provided in the case and forms a boundary between the second chamber and the third chamber; and a third partition wall which is provided in the case and forms a boundary between the first chamber and the third chamber. A first hole and a second hole are formed in the second partition wall.

In this aspect, the first hole may be nearer the first chamber than the second hole is.

According to this structure, the first hole and the second hole are provided in that order from the first chamber side. Therefore, fluid moves through the first hole that is close to the first chamber, while air moves through the second hole that is far from the first chamber. As a result, fluid can be prevented from flowing outside from the second chamber.

A second aspect of the invention relates to a remote controlled manual transmission. This remote controlled manual transmission includes the transmission according to the first aspect; a shift select lever shaft which executes a shift in the transmission by moving in a shift direction and a select direction; a push-pull cable that is connected to the shift select lever shaft; and a shift lever that is connected to the push-pull cable.

A third aspect of the invention relates to a sequential transmission. This sequential transmission includes the transmission according to the first aspect; a shift select lever shaft which executes a shift in the transmission by moving in a shift direction and a select direction; and an actuator that drives the shift select lever shaft.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF EMBODIMENTS

Example embodiments of the present invention will be described in greater detail below with reference to the accompanying drawings. Incidentally, in the example embodiments below, like or corresponding parts will be denoted by like reference characters and descriptions of those parts will not be repeated. Further, the example embodiments may also by combined.

Figure 1:
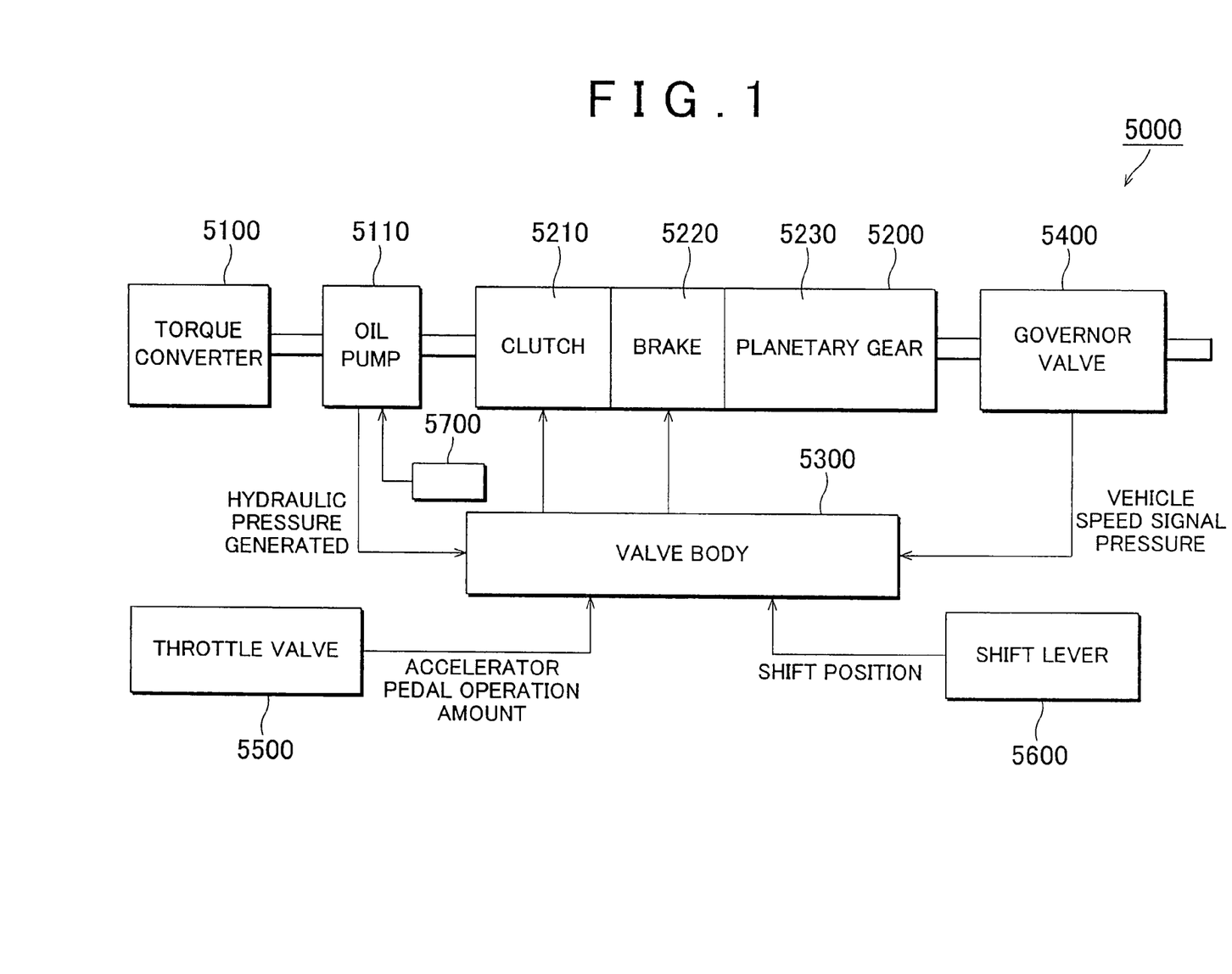
FIG. 1 is a block diagram of the structure of an automatic transmission having a breather structure according to a first example embodiment of the invention.

(First example embodiment) FIG. 1 is a block diagram of a structure of an automatic transmission 5000 having a breather structure according to a first example embodiment of the invention. This automatic transmission 5000 includes a planetary gear unit 5200 and a valve body 5300.

The planetary gear unit 5200 is a mechanism for changing (i.e., increasing or decreasing) the speed, or reversing the rotational direction, of the output transmitted from a torque converter 5100. The power output from the planetary gear unit 5200 is transmitted to a governor valve 5400.

The valve body 5300 is a device which forms a hydraulic control system that performs a shift by detecting the vehicle speed and the accelerator pedal operation amount and automatically operating a clutch 5210, a brake 5220, and a planetary gear 5230 of the planetary gear unit 5200.

Output from the torque converter 5100 rotates an oil pump 5110, generating hydraulic pressure that is transmitted to the valve body 5300. The hydraulic pressure in the valve body 5300 is transmitted to the clutch and/or the brake to control the operation of the planetary gear unit 5200.

The governor valve 5400 transmits a vehicle speed signal pressure to the valve body 5300. The valve body 5300 receives information related to the accelerator operation amount from a throttle valve 5500 or information related to the shift position from a shift lever 5600.

The oil pump 5110 pumps oil (i.e., transmission fluid) stored in an oil pan. The oil stored in the oil pan passes through a transmission strainer 5700 on its way to the oil pump 5110. This transmission strainer 5700 removes foreign matter from the oil.

Figure 2:
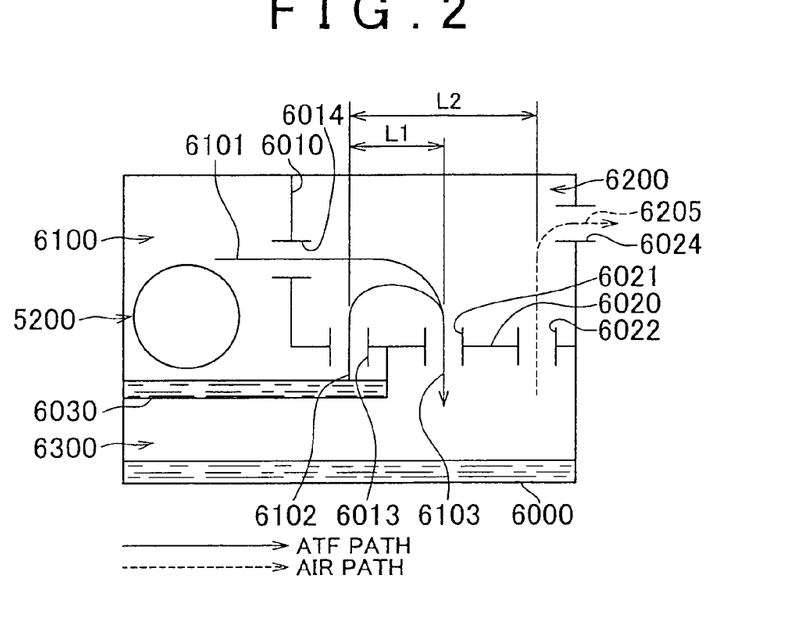
FIG. 2 is a sectional view of the internal structure of a transmission case used with the transmission according to the first example embodiment.

FIG. 2 is a sectional view of the internal structure of a transmission case 6000 used with the transmission according to the first example embodiment. This transmission case 6000 has three partition walls, i.e., a first partition wall 6010, a second partition wall 6020, and a third partition wall 6030, inside of it. The area enclosed by the first partition wall 6010 and the third partition wall 6030 is a first chamber 6100, the space enclosed by the first partition wall 6010 and the second partition wall 6020 is a second chamber 6200, and the space enclosed by the second partition wall 6020 and the third partition wall 6030 is a third chamber 6300. A rotating object such as the planetary gear unit 5200 is housed in the first chamber 6100. The planetary gear unit 5200, i.e., the rotating object, is lubricated by ATF (automatic transmission fluid) (registered trademark). A third hole 6013 and a fourth hole 6014 are formed in the first partition wall 6010. Incidentally, it is not absolutely essential that two holes such as those shown in FIG. 2 be formed in the first partition wall 6010 as long as at least one hole is formed in the partition wall 6010.

The first chamber 6100 contains a large amount of ATF for lubricating the rotating object. This ATF may spill out of the fourth hole 6014 and the third hole 6013, as shown by the arrows 6101 and 6102, into the second chamber 6200.

The second chamber 6200 is a breather chamber that is communicated with outside air through a fifth hole 6024.

That is, the pressure within the second chamber 6200 is equal to atmospheric pressure. A first hole 6021 and a second hole 6022 are provided in the second partition wall 6020. The distance L1 from the third hole 6013, which is the hole in the first partition wall 6010 that is closest to the third chamber 6300, to the first hole 6021 is shorter than the distance L2 from the third hole 6013 to the second hole 6022. Also, although not shown, the distance from the fourth hole 6014 in the first partition wall 6010 to the first hole 6021 is also shorter than the distance from the fourth hole 6014 to the second hole 6022.

Accordingly, ATF that has spilled out of the third hole 6013 and the fourth hole 6022 runs from the second chamber 6200 into the third chamber 6300 through the first hole 6021 that is near the third hole 6013 and the fourth hole 6014. As the ATF runs into the third chamber 6300 through the first hole 6021, air in the third chamber 6300 is forced out through the second hole 6022 in the direction shown by arrow 6205, i.e., toward the outside. The ATF that runs from the second chamber 6200 into the third chamber 6300 flows as shown by arrow 6103.

The third chamber 6300 is an oil pan in which a sufficient amount of ATF is stored. The third chamber 6300 is positioned vertically below the first chamber 6100 and the second chamber 6200. The pressure in the first chamber 6100 is the highest, the pressure in the third chamber 6300 is the second highest, and the pressure in the second chamber 6200 is the lowest. The first hole 6021 and the second hole 6022 are both formed on the same plane as the third hole 6013. The second hole 6022 is positioned out of the path along which the ATF is discharged. In this example embodiment, the second hole 6022 is arranged closer to the fifth hole 6024 than the first hole 6021 is.

The automatic transmission according to the first example embodiment structured in this way has the first partition wall 6010, the second partition wall 6020, and the third partition wall 6030 inside the transmission case 6000. As described above, the first partition wall 6010 forms a boundary between the first chamber 6100 which houses the rotating object, and the second chamber 6200 which is communicated with the first chamber 6100 and maintains equal pressure between the outside air and the first chamber 6100. The second partition wall 6020 forms a boundary between the second chamber 6200 and the third chamber 6300 where fluid is stored below the second chamber 6200, while the third partition wall 6030 forms a boundary between the first chamber 6100 and the third chamber 6300. The first hole 6021 and the second hole 6022 are provided in that order in the second partition wall 6020 from the first chamber 6100 side. The first hole 6021 functions as an ATF discharge hole, while the second hole 6022 functions as an air hole.

The pressure in the first chamber 6100 is higher than the pressure in the third chamber 6300, and the pressure in the third chamber 6300 is higher than the pressure in the second chamber 6200.

ATF that has spilled out of the first chamber 6100 runs under its own weight into the third chamber 6300 through the first hole 6021. As the ATF runs into the third chamber 6300, air in the third chamber 6300 is forced out into the second chamber 6200 through the second hole 6022. The third hole 6013 that allows the fluid to move from the first chamber 6100 into the second chamber 6200 is provided in the first partition wall 6010.

With the transmission structured in this way, the mechanical structure is able to prevent oil from leaking out of the transmission case 6000 from the second chamber 6200.

Figure 3:
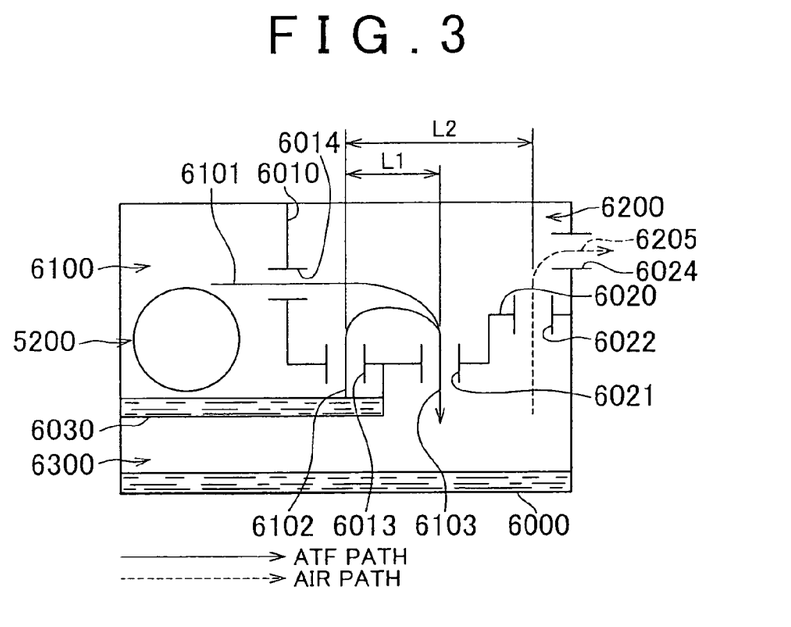
FIG. 3 is a sectional view of the internal structure of the transmission case used with a transmission according to a second example embodiment of the invention.

(Second example embodiment) FIG. 3 is a sectional view of the transmission case 6000 used with a transmission according to a second example embodiment of the invention. In the transmission case 6000, a step is provided in the second partition wall 6020, with the first hole 6021 formed on the lower side of the step and the second hole 6022 formed on the upper side of the step. The transmission according to this second example embodiment structured in this way displays the same effects as the transmission according to the first example embodiment. Furthermore, the first hole 6021 for enabling fluid (i.e., ATF) to flow from the second chamber 6200 into the third chamber 6300 is formed in a low portion of the second partition wall 6020, and the second hole 6022 for enabling air to flow from the third chamber 6300 into the second chamber 6200 (and therefore outside) is formed in a high portion of the second partition wall 6020. Therefore, compared with the first example embodiment, this structure makes it even more difficult for ATF to flow through the second hole 6022. As a result, ATF can be inhibited from leaking out of the transmission case 6000.

Figure 4:
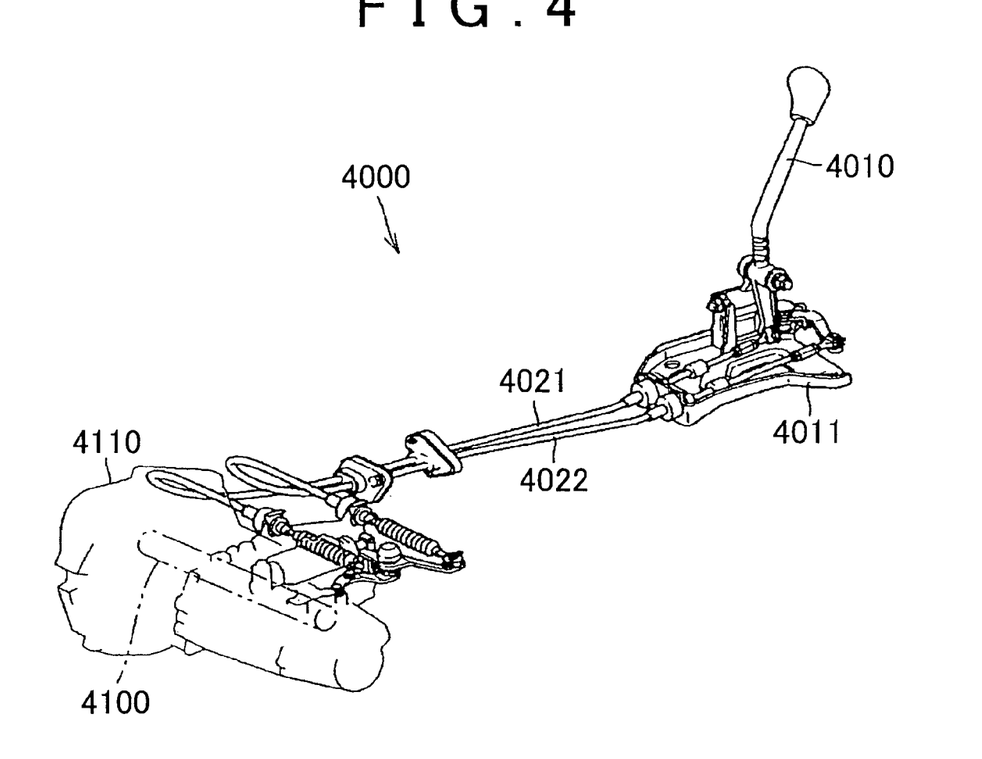
FIG. 4 is a perspective view of a remote controlled manual transmission using a transmission case according to a third example embodiment of the invention.

(Third example embodiment) FIG. 4 is a perspective view of a remote controlled manual transmission using a transmission case according to a third example embodiment of the invention. The transmission of the invention may also be a remote controlled transmission. A shift select lever shaft 4100 is provided inside a transmission case 4110. An inner lever is provided with the shift select lever shaft 4100, and shifting (both a shift operation and a select operation) is performed using this inner lever.

A shift is executed by the shift select lever shaft 4100 moving in the shift direction and the select direction. Push-pull cables 4021 and 4022 are connected to the shift select lever shaft 4100. One of these push-pull cables 4021 or 4022 moves the shift select lever shaft 4100 in the shift direction, and the other moves the shift select lever shaft 4100 in the select direction.

The push-pull cables 4021 and 4022 are connected to the shift lever 4010 on a control shift retainer 4011. When the driver operates the shift lever 4010, that operation is transmitted to the push-pull cables 4021 and 4022. A shift is performed by the push-pull cables 4021 and 4022 moving the shift select lever shaft 4100 in the shift and select directions.

With the remote controlled transmission 4000 shown in FIG. 4, the shift lever 4010, which is operated by the driver, and the transmission case 4110 are separated but connected together by the cables and links and the like. The shift lever 4010 may be a column shift type shift lever which is provided on a portion of a steering wheel column, or a floor shift type shift lever which is provided on the floor.

The shift select lever shaft 4100 as well as gears for transmitting power are provided in the first chamber 6100 in FIGS. 2 and 3. The transmission according to this third example embodiment structured in this way displays the same effects as the transmissions according to the first and second example embodiments.

Figure 5:
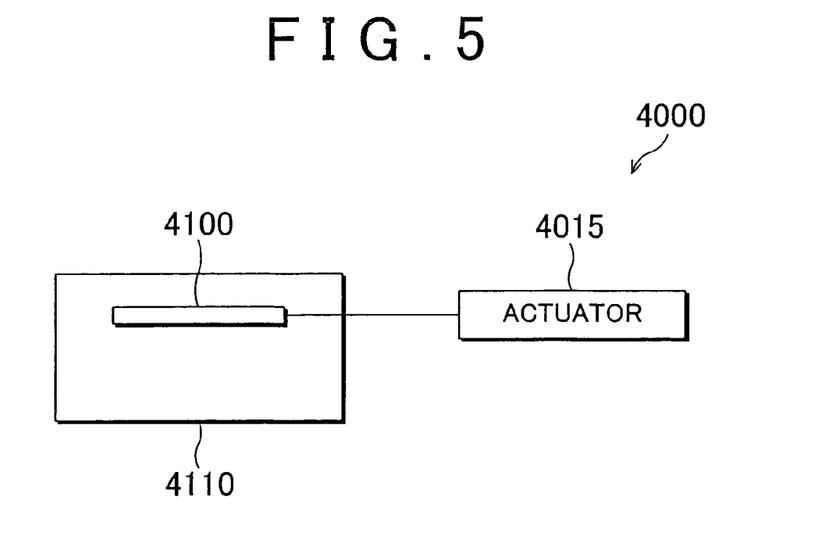
FIG. 5 is a view showing a frame format of a sequential transmission that employs a breather structure according to a fourth example embodiment of the invention.

(Fourth example embodiment) FIG. 5 is a view showing a frame format of a sequential transmission that employs a breather structure according to a fourth example embodiment of the invention. The structures according to the first and second example embodiments may also be used with a transmission that drives the shift select lever shaft 4100 provided in the transmission case 4110 using an actuator 4015.

The actuator 4015 operates according to a program stored in advance or a signal input by the driver. This actuator 4015 drives the shift select lever shaft 4100 in the shift direction and the select direction. The shift select lever shaft 4100 and the gears for transmitting power are housed in the first chamber 6100.

The transmission according to this fourth example embodiment structured in this way also displays the same effects as the transmissions according to the first through the third example embodiments.

Figure 6:
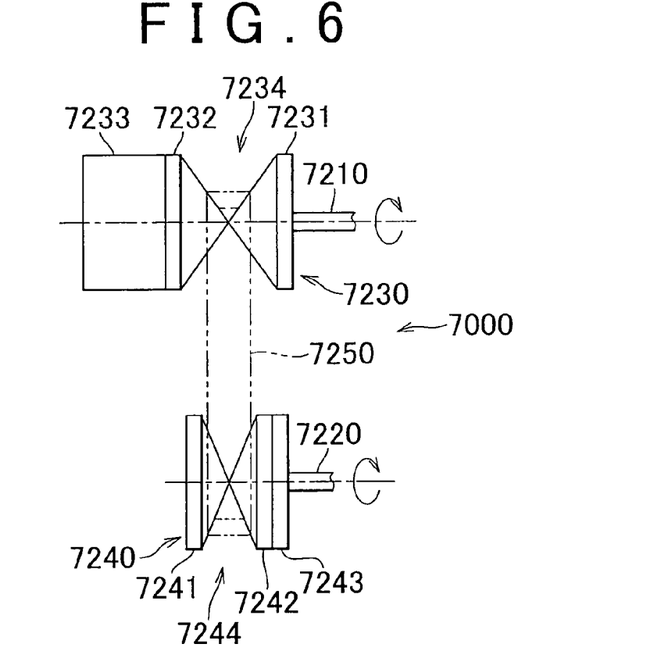
FIG. 6 is a view showing a frame format of a continuously variable transmission having a breather structure according to a fifth example embodiment of the invention, as it appears when the final reduction ratio is established.
Figure 7:
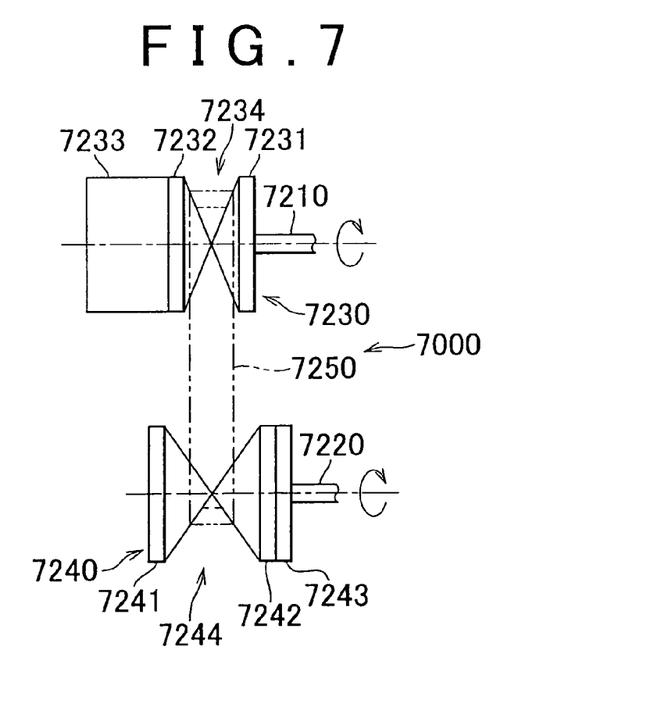
FIG. 7 is a view showing a frame format of the continuously variable transmission having a breather structure according to the fifth example embodiment, as it appears when the highest ratio is established.

(Fifth example embodiment) FIG. 6 is a view showing a frame format of a continuously variable transmission having a breather structure according to a fifth example embodiment of the invention, as it appears when the final reduction ratio is established. FIG. 7 is a view showing a frame format of the continuously variable transmission having a breather structure according to the fifth example embodiment, as it appears when the highest speed ratio is established. Referring to FIGS. 6 and 7, a continuously variable transmission 7000 may also be housed in the first chamber 6100.

The continuously variable transmission 7000 includes a primary shaft 7210 on the driving side into which rotational force from an internal combustion engine is input, a secondary shaft 7220 on the driven side which outputs rotational force, a primary pulley 7230 provided on the primary shaft 7210, a secondary pulley 7240 provided on the secondary shaft 7220, and a belt 7250. The primary shaft 7210 and the secondary shaft 7220 are arranged parallel to each other with a space in between them. The continuously variable transmission 7000 is able to change the ratio between the rotation speed of the primary shaft 7210 and the rotation speed of the secondary shaft 7220 (i.e., shift the transmission) continuously (in a non-stepped manner).

The primary pulley 7230 rotates together with the primary shaft 7210 about the center axis of the primary shaft 7210 which is the upper shaft. The primary pulley 7230 includes a fixed sheave 7231, a movable sheave 7232, and a hydraulic actuator 7233 that can move the movable sheave 7232 toward or away from the fixed sheave 7231.

The secondary pulley 7240 rotates together with the secondary shaft 7220 about the center axis of the secondary shaft 7220 which is the lower shaft. The secondary pulley 7240 includes a fixed sheave 7241, a movable sheave 7242, and a hydraulic actuator 7243 that can move the movable sheave 7242 toward or away from the fixed sheave 7241.

The fixed sheave 7231 is fixed to the primary shaft 7210 so as not to be able to move in either the circumferential or axial direction with respect to the primary shaft 7210. Similarly, the fixed sheave 7241 is fixed to the secondary shaft 7220 so as not to be able to move in either the circumferential or axial direction with respect to the secondary shaft 7220. A V-shaped groove 7234 is formed between the fixed sheave 7231 and the movable sheave 7232. Similarly, a V-shaped groove 7244 is formed between the fixed sheave 7241 and the movable sheave 7242. A hydraulic actuator 7233 changes the width of the pulley groove 7234 by moving the movable sheave 7232 closer to or farther away from the fixed sheave 7231. Similarly, a hydraulic actuator 7243 changes the width of the pulley groove 7244 by moving the movable sheave 7242 closer to or farther away from the fixed sheave 7241. This increases or decreases the winding radius (i.e., the effective winding radius) of the belt 7250 around the primary pulley 7230 and the secondary pulley 7240, resulting in a shift.

The transmission according to this fifth example embodiment structured in this way displays the same effects as the transmissions according to the first through the fourth example embodiments.

With the transmission case 6000 in the second example embodiment described above, the first hole 6021 and the second hole 6022 are provided at different distances from the first partition wall 6010. However, the invention is not limited to this. For example, the first hole 6021 and the second hole 6022 may be provided at the same distance from the first partition wall 6010 and at different distances from the third hole 6013 and the fourth hole 6014. More specifically, the first hole 6021 may be arranged nearer the third hole 6013 and the fourth hole 6014 than the second hole 6022 is.

Figure 8:
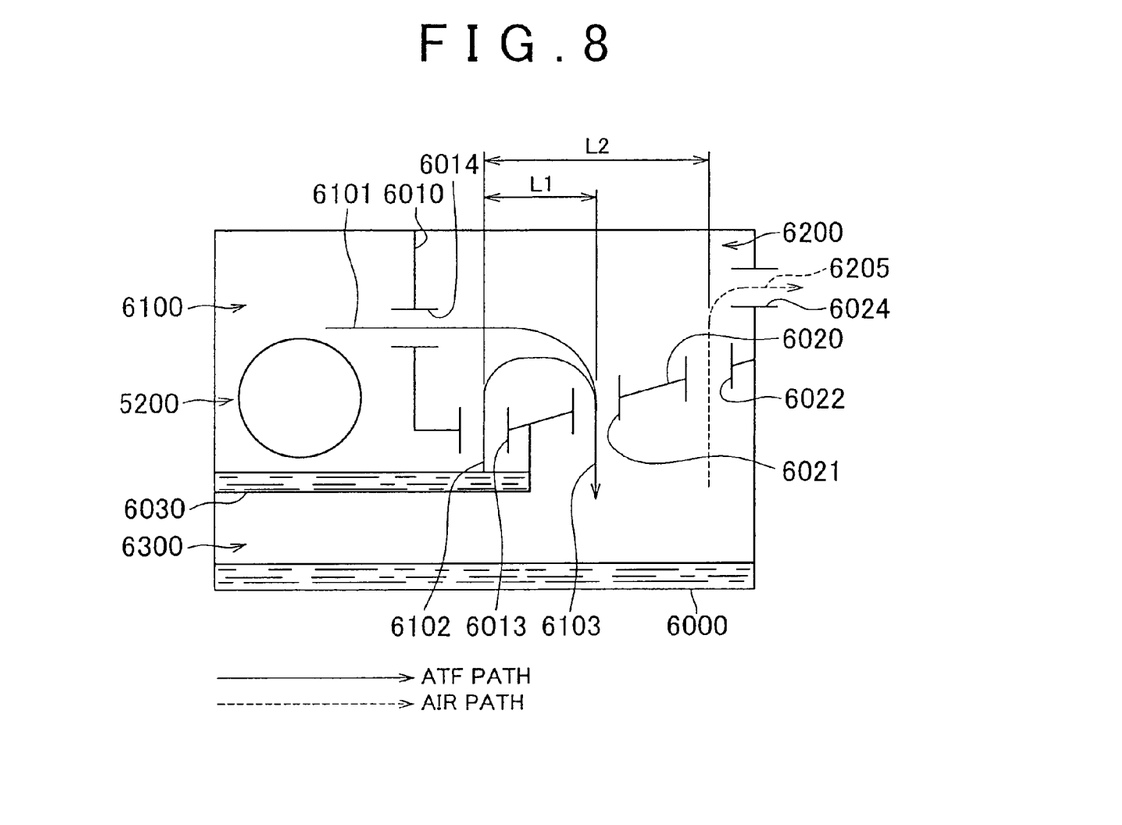
FIG. 8 is a sectional view of the internal structure of the transmission case used with a transmission according to a modified example of the second example embodiment of the invention.

With the transmission case 6000 in the second example embodiment described above, providing the step in the second partition wall 6020 enables the first hole 6021 to be provided on the lower side and the second hole 6022 to be provided on the upper side. However, the invention is not limited to this. For example, as shown in FIG. 8, the vertical difference between the first hole 6021 and the second hole 6022 may also be established by a slope in which the second partition wall 6020 gradually becomes higher from the first hole 6021 toward the second hole 6022.

In this case, the first hole 6021 may be provided in the vertically lowest portion of the second partition wall 6020, and the second hole 6022 may be provided in the vertically highest portion of the second partition wall 6020.

In the present invention described above, the first hole may be a hole through which the fluid is discharged from the second chamber into the third chamber, and the second hole is an air hole.

In the present invention described above, the pressure in the first chamber may be higher than the pressure in the third chamber, and the pressure in the third chamber may be higher than the pressure in the second chamber.

In the present invention described above, fluid that has spilled from the first chamber into the second chamber may run under its own weight into the third chamber through the first hole.

In the present invention described above, air in the third chamber may move into the second chamber through the second hole.

In the present invention described above, the first partition wall may include a third hole that allows the fluid to move from the first chamber into the second chamber.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. An automatic transmission comprising:
   a case having an internal space;
   a first partition wall provided in the case, the first partition wall forming a boundary between a first chamber and a breather chamber, the first chamber housing a planetary gear unit, the breather chamber being connected to the first chamber, and the breather chamber maintaining equal pressure between outside air and the first chamber;
   a second partition wall provided in the case, the second partition wall forming a boundary between the breather chamber and an oil pan, and the oil pan storing automatic transmission fluid below the breather chamber; and
   a third partition wall provided in the case, the third partition wall forming a boundary between the first chamber and the oil pan, wherein
   the oil pan is located vertically below both of the first chamber and the breather chamber,
   a first hole and a second hole are formed in the second partition wall, and
   the first hole is closer to the first chamber than the second hole.

2. The automatic transmission according to claim 1, wherein the first hole is a hole through which the automatic transmission fluid is discharged from the breather chamber into the oil pan, and the second hole is an air hole.

3. The automatic transmission according to claim 1, wherein the pressure in the first chamber is higher than the pressure in the oil pan, and the pressure in the oil pan is higher than the pressure in the breather chamber.

4. The automatic transmission according to claim 1, wherein the automatic transmission fluid that has spilled from the first chamber into the breather chamber runs under its own weight into the oil pan through the first hole.

5. The automatic transmission according to claim 1, wherein air in the oil pan moves into the breather chamber through the second hole.

6. The automatic transmission according to claim 1, wherein the first partition wall includes a third hole that allows the automatic transmission fluid to move from the first chamber into the breather chamber.

7. The transmission according to claim 6, wherein the first hole is closer to the third hole than the second hole.

8. The transmission according to claim 1, wherein the second hole is positioned out of a path along which the automatic transmission fluid is discharged from the first chamber.

9. The transmission according to claim 1, wherein the first chamber and the breather chamber are adjacent to one another.

10. The transmission according to claim 1, wherein the first hole and the second hole are vertically at substantially the same height.

11. The transmission according to claim 1, wherein the first hole is vertically lower than the second hole.

12. The transmission according to claim 11, wherein the height difference between the first hole and the second hole is established by the second partition wall being formed in a step shape.

13. The transmission according to claim 11, wherein the height difference between the first hole and the second hole is established by a slope of the second partition wall.

14. The transmission according to claim 13, wherein the first hole is formed in the vertically lowest portion of the second partition wall, and the second hole is formed in the vertically highest portion of the second partition wall.

15. A remote controlled manual transmission comprising:
    the transmission according to claim 1;
    a shift select lever shaft which executes a shift in the transmission by moving in a shift direction and a select direction;
    a push-pull cable that is connected to the shift select lever shaft; and
    a shift lever that is connected to the push-pull cable.

16. A sequential transmission comprising:
    the transmission according to claim 1;
    a shift select lever shaft which executes a shift in the transmission by moving in a shift direction and a select direction; and
    an actuator that drives the shift select lever shaft.

* * * * *